United States Patent [19]

Rock

[11] 4,357,567

[45] Nov. 2, 1982

[54] REVERSIBLE MOTOR

[75] Inventor: Brian Rock, Dukinfield, England

[73] Assignee: Barcrest Limited, Ashton-under-Lyne, England

[21] Appl. No.: 197,186

[22] Filed: Oct. 15, 1980

[30] Foreign Application Priority Data

Oct. 19, 1979 [GB] United Kingdom ............... 7936289

[51] Int. Cl.³ .............................................. G05B 11/00
[52] U.S. Cl. .................................. 318/687; 318/135; 318/288; 318/290
[58] Field of Search ............... 318/687, 135, 288, 289, 318/290, 296, 297

[56] References Cited

U.S. PATENT DOCUMENTS

| | | | |
|---|---|---|---|
| 2,753,501 | 7/1956 | Brailsford | 318/288 X |
| 3,474,318 | 10/1969 | Fougeront | 318/297 X |
| 3,867,675 | 2/1975 | Kitz et al. | 318/135 X |
| 3,894,276 | 7/1975 | Janssen | 318/135 |
| 3,895,281 | 7/1975 | Corbaz | 318/687 |

OTHER PUBLICATIONS

IBM Technical Disclosure, Permanent Magnetic Core, M. Fromer, Sep. 70.

*Primary Examiner*—B. Dobeck
*Attorney, Agent, or Firm*—Holman & Stern

[57] ABSTRACT

A reversible linear motor has a coil arrangement arranged alongside a conductive body such as a rotatable aluminium disc. The coil arrangement is made up of three separate coils: namely an inner coil and two interconnected outer coils on opposite sides of the inner coil. The coils are connected to a single phase a.c. supply and the drive of the disc can be reversed by reversing the connection of the inner coil relative to the two outer coils. The linear motor may be used for driving a reel of an entertainment machine of the fruit machine kind.

8 Claims, 5 Drawing Figures

REVERSIBLE MOTOR

This invention relates to a reversible linear motor.

The motor of the invention may comprise a member which is mounted on a support structure so as to be rotatable relative thereto through a plurality of predetermined stopping positions; and the invention is particularly concerned with such a rotatably mounted member which is a reel assembly of a coin-freed gaming-type entertainment machine of the kind known as a fruit machine, that is, a rotatably mounted member in which the member is a drum or disc (or reel) which in use is provided with a plurality of symbols, such as fruit, around the periphery thereof and can be rotated for a period of time and then brought to rest at one of say 20 stopping positions thereof to display in such stopping position one or more of said symbols. A fruit machine usually has three or four such reels whereby in use, during play of a game, the reels may rotate for different random periods of time and display when stopped a randomly selected combination of symbols; and a position identifying system is used to provide a machine interpretable identification of the selected symbols whereby a win mechanism such as a pay-out device can be actuated in the event that the displayed combination of symbols corresponds to a predetermined winning combination.

In our co-pending U.K. Patent Application No. 2035648 there is disclosed a rotatably mounted member comprising a member which is mounted on a support structure so as to be rotatable relative thereto through a plurality of predetermined stopping positions, an electrical drive motor being provided for effecting said rotation of the member, and indexing means being provided for stopping the member in one of said stopping positions thereof, characterised in that said drive motor is an integral part of the rotatably mounted member. In one embodiment of the invention described in such Application, the drive motor is a rotary linear motor having a metal rotor in the form of a disc or cylinder and a fixed coil structure which is positioned alongside a surface of the rotor and in use generates a magnetic field moving in the plane of such surface, said coil structure having two coils one of which is fed directly from an a.c. supply and the other of which is fed from such supply via a capacitor whereby by reversing the connection of one coil it is possible to reverse the direction of rotation of the rotor. Such reversing of the rotor is required in the context of a fruit machine in the case where there is a reverse 'nudge' facility, i.e. where a control is provided for causing a stationary drum or disc to step backwards from one stopping position to the next successive stopping position.

With the arrangement of the above mentioned embodiment problems may be encountered with regard to obtaining equal torque in both forward and reverse directions of rotation with a simple and efficient structure, due to the change in mutual inductance produced by the coil reversal.

An object of the present invention is to provide a simple and efficient reversible linear motor with which it is possible to achieve substantially equal driving forces in both directions of drive thereof.

According to the invention therefore there is provided a reversible linear motor comprising a coil arrangement and a conductive body which are mounted so as to be movable one relative to the other, characterised in that the coil arrangement has three separate coils disposed adjacent the conductive body: namely a pair of interconnected coils spaced from each other in the direction of said relative movement of the body and the coil arrangement, and a third coil between the pair of coils, the coils being arranged for connection to a single phase a.c. supply, and reversing means being provided for reversing the connection of the third coil, or the interconnected pair of coils, relative to the supply.

In one embodiment the two outer coils are substantially identically wound coils of opposite hand interconnected via a tuning capacitor to give a singly tuned pair, and the central coil is predominantly inductive, whereby the magnetic fluxes of the two outer coils are anti-phase to each other (180° apart) and the phase of the magnetic flux of the central coil lies between the outer coils (spaced by 90° from each coil). With this arrangement the pair of singly tuned outer coils are balanced magnetically about the single central coil so that reversal of mutual inductance due to reversal of the central coil (or reversal of the outer coils) cannot detune the coil pair. Thus, even in a system with high mutual inductance it is possible to achieve equal torque in opposite driving directions with a simple and efficient arrangement.

Most preferably the said conductive body comprises a rotatable member as hereinbefore described.

The invention will now be described further by way of example only and with reference to the accompanying drawings in which.

Figure 1:
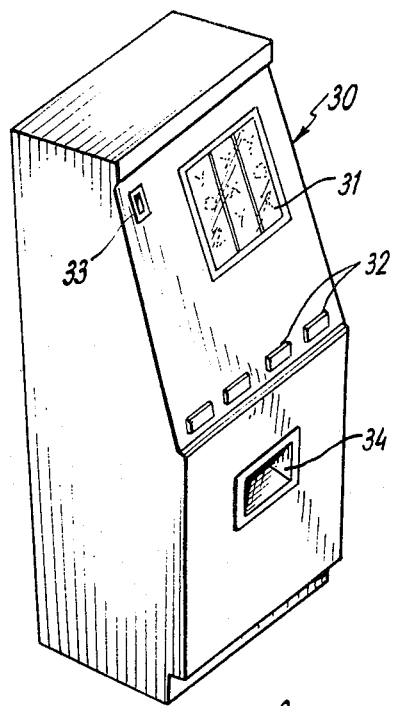
FIG. 1 is a diagrammatic perspective view of one form of a fruit machine incorporating motors in accordance with one embodiment of the invention.

The fruit machine has a cabinet 30 containing three reels rotatable behind a window 31 and having control buttons 32, a coin or token inlet slot 33 leading to an internal coin-freed mechanism and an outlet chute 34 leading from an internal pay-out mechanism. Each reel comprises a drum 1 which may be formed from plastics material and has one circular end wall 2 and a cylindrical peripheral wall 3.

Figure 3:
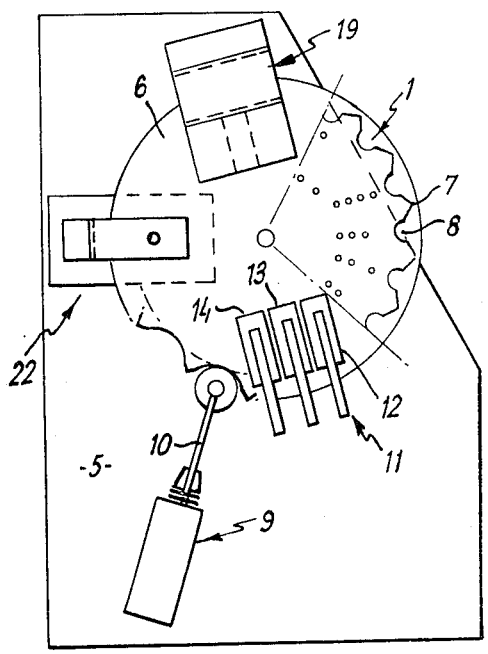
FIG. 3 is a diagrammatic end view of the reel assembly of FIG. 2.
Figure 2:
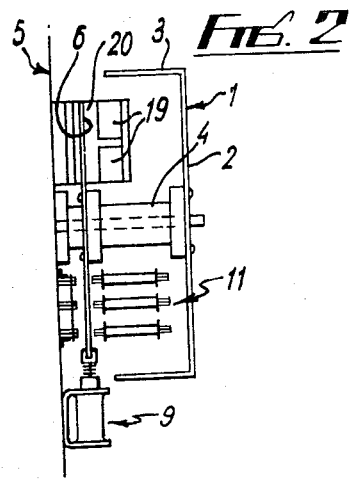
FIG. 2 is a diagrammatic plan view (with parts omitted for the sake of clarity) of one reel assembly of the fruit machine of FIG. 1.

The drum 1 is secured to an axially extending central boss 4 which is rotatably mounted on a shaft fixed on a support structure 5. This structure 5 may be in the form of a rigid metal plate extending parallel to the wall 2 of the drum 1. Within the drum 1, an aluminium disc 6 is fixed on the shaft 4 and extends parallel to the end wall 2. The disc 6 as shown in FIG. 3 has 20 V-shaped teeth 7 cut at regular intervals around its entire periphery, 20 V-shaped cut-outs 8 being defined between the teeth 7. An electromagnetic indexing device 9 is mounted on the support structure 5 and this device has a solenoid operated catch finger 10 with a roller at the end thereof which is normally held spaced from the teeth 7 so as to permit free rotation of the disc 6 but which can be moved forwards, on de-energisation of the solenoid of the device 9, to engage a cut-out 8 between two teeth 7 and thereby prevent rotation of the disc 6.

A coil arrangement 11 is also mounted on the support structure 5 adjacent the disc 6. The coil arrangement 11 comprises three separate coils 12, 13, 14 disposed within the confines of the drum 1 and spaced in the circumferential direction of the disc and each having a respective U-shaped laminated metal core straddling the disc. The free ends of the U-shaped cores define poles facing each other and between which the disc can rotate. The laminations of the cores have splayed-out ends at such poles thereby to increase the effective surface area thereof which confronts the disc. The two outer coils 12, 14 are similarly wound coils of opposite hand and are interconnected via a capacitor 15 to define a singly tuned coil pair which is connected across a single phase a.c. supply. The central coil 13 is connected to the same supply via a reversing switch. The magnetic fluxes in the coils 12, 14 are 180° out of phase, and the magnetic flux in the predominantly inductive central coil 13 is spaced by 90° from the fluxed in both coils 12, 14. The coil arrangement 11 and the disc 6 therefore define a single phase short rotary linear motor. The disc 6 is urged in one particular direction. By reversing the connection of the coil 13 with the switch 16, the direction of rotation of the disc 6 can be reversed. Since the coils 12, 14 are balanced magnetically about the coil 13 reversal of the coil 13 does not detune the pair 12, 14. A permanent magnet arrangement 19 is also mounted on the structure 5 alongside the disc 6, such arrangement having two magnets with North and South poles thereof facing the side of the disc adjacent the drum 1 and a U-shaped metal stirrup 20 which straddles the disc and provides a flux return plate on the opposite side of the disc. Rotation of the disc gives rise to induction of eddy currents therein due to the action of the magnet and the resulting magnetic field interacts with the magnetic field of the magnet to resist rotation of the disc. The rotational speed of the disc 6 is thereby limited.

The reel assembly so far described is mounted together with other like reel assemblies in the fruit machine cabinet 30. In use, after insertion of one or more coins or tokens into a coin mechanism via the slot 33, a player can operate the machine to set the drums of the reel assemblies in rotation. When the drums 1 are brought to rest, after different random periods of rotation, with the indexing devices 9, the positions of the drums 1 are detected with code-reading devices 22 which use light sources 21 and sensors 23 on opposite sides of the discs to scan coded arrangements of holes therein and as described in greater detail in, for example, U.K. Patent Application No. 7936290. Electrical outputs from the code-reading devices are interpreted with a win detection system and pay-out mechanisms are actuated in the event that a winning combination of drum stopping positions is detected.

Figure 4:
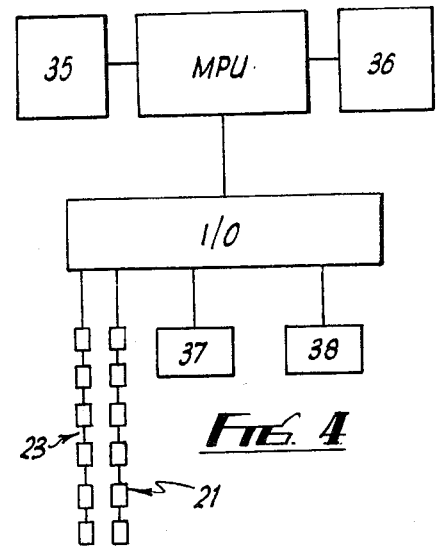
FIG. 4 is a block circuit diagram of a control system of the machine.
Figure 5:
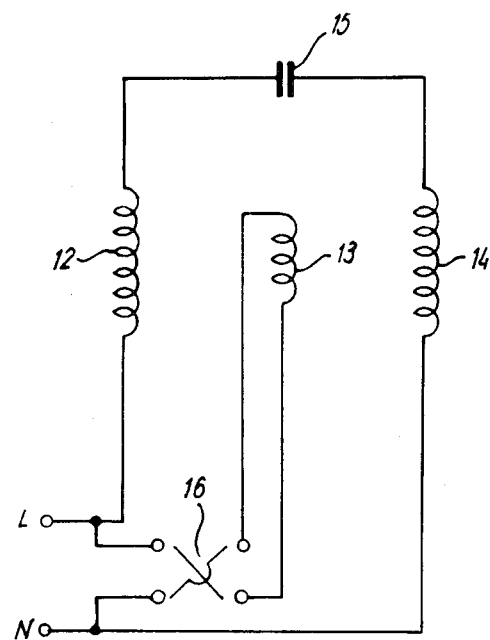
FIG. 5 is a circuit diagram of the coil arrangement of one linear motor drive of the machine.

As shown in FIG. 4, the machine incorporates electronic control circuitry which uses a central processing unit such as a microprocessor MPU which has connected thereto appropriate processor power supply and auxiliary control devices 35, memory devices 36 and an input/output interface device i/o. The interface device i/o is connected to input devices 37 such as the controls and the coin mechanism and output devices 37 such as pay-out solenoids, indicator lamps and the like. The interface device i/o is also connected to the position identifying system of the different reel assemblies and also the indexing mechanisms 9 and the reversing switches 16 thereby to control operation of such mechanisms 9, switches 16 and also to interpret and evaluate position identifying and indexing data. For a further description of suitable electronic circuitry reference is made to U.K. Pat. No. 1,545,301.

It is of course to be understood that the invention is not intended to be restricted to the details of the above embodiment which are described by way of example only.

I claim:

1. A reversible linear motor comprising a coil arrangement and a conductive body which are mounted so as to be movable one relative to the other, wherein the coil arrangement has three separate coils disposed adjacent the conductive body: namely a pair of interconnected coils spaced from each other in the direction of said relative movement of the body and the coil arrangement, and a third coil between the pair of coils, the coils being arranged for connection to a single phase a.c. supply, and reversing means being provided for reversing the connection of the third coil, or the interconnected pair of coils, relative to the supply, and wherein the two outer coils are substantially identically would coils of opposite hand interconnected via a tuning capacitor to give a singly tuned pair, and the central coil is predominantly inductive, whereby the magnetic fluxes of the two outer coils are anti-phase to each other (180° apart) and the pase of the magnetic flux of the central coil lies between the outer coils (spaced by 90° from each coil).

2. A motor according to claim 1, characterised in that the conductive body is an axially rotatable metal disc.

3. A motor according to claim 1, characterised in that each coil has a core straddling the conductive body.

4. A motor according to claim 1, characterised in that a magnet is positioned alongside the disc to clamp rotation thereof.

5. A coin-operated entertainment machine having a plurality of members mounted on a support structure so as to be rotatable relative thereto through a plurality of predetermined stopping positions, means operable to effect said rotation and subsequently to cause the members to stop in ones of said stopping positions, and an electrical position identifying system for identifying said ones of said stopping position, characterized in that for each said member there is provided a reversible linear motor for driving same, said motor comprising a coil arrangement and a conductive body which are mounted so as to be movable one relative to the other and thereby effect rotation of the said member, wherein the coil arrangement has three separate coils disposed adjacent the conductive body: namely a pair of interconnected coils spaced from each other in the direction of said relative movement of the body and the coil arrangement, and a third coil between the pair of coils, the coils being arranged for connection to a single phase a.c. supply, and reversing means being provided for reversing the connection of the third coil, or the interconnected pair of coils, relative to the supply, and wherein the two outer coils are substantially identically wound coils of opposite hand interconnected via a tuning capacitor to give a singly tuned pair, and the central coil is predominantly inductive, whereby the magnetic fluxes of the two outer coils are anti-phase to each other (180° apart) and the phase of the magnetic flux of the central coil lies between the outer coils (spaced by 90° from each coil).

6. A machine according to claim 5, characterised in that for each member said conductive body comprises an axially rotatable disc separate to but directly drivably connected to the said member.

7. A machine according to claim 7, wherein indexing means is provided for stopping the member in any of the said predetermined stopping positions thereof characterised in that said indexing means comprises retaining means interengageable with the disc.

8. A machine according to claim 7, characterised in that said position identifying system is adapted to read position identifying structures on said disc.

* * * * *